US010600410B2

(12) United States Patent
Fujimura et al.

(10) Patent No.: US 10,600,410 B2
(45) Date of Patent: Mar. 24, 2020

(54) EDIT ASSISTING SYSTEM, EDIT ASSISTING DEVICE AND EDIT ASSISTING METHOD

(71) Applicant: KABUSHIKI KAISHA TOSHIBA, Minato-ku, Tokyo (JP)

(72) Inventors: Hiroshi Fujimura, Yokohama Kanagawa (JP); Kenji Iwata, Machida Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 239 days.

(21) Appl. No.: 15/691,002

(22) Filed: Aug. 30, 2017

(65) Prior Publication Data

US 2018/0277109 A1 Sep. 27, 2018

(30) Foreign Application Priority Data

Mar. 22, 2017 (JP) ................................ 2017-055422

(51) Int. Cl.
| | | |
|---|---|---|
| *G10L 15/00* | (2013.01) | |
| *G10L 15/22* | (2006.01) | |
| *G06F 3/16* | (2006.01) | |
| *G10L 15/30* | (2013.01) | |
| *G10L 15/02* | (2006.01) | |
| *G10L 15/04* | (2013.01) | |

(Continued)

(52) U.S. Cl.
CPC .............. *G10L 15/22* (2013.01); *G06F 3/167* (2013.01); *G10L 15/30* (2013.01); *G10L 15/02* (2013.01); *G10L 15/04* (2013.01); *G10L 15/183* (2013.01); *G10L 15/1822* (2013.01)

(58) Field of Classification Search
CPC combination set(s) only.
See application file for complete search history.

(56) References Cited

U.S. PATENT DOCUMENTS 8,046,227 B2 * 10/2011 Starkie ...................... G06F 8/30
704/270.1
2010/0049517 A1 * 2/2010 Huang .................. G06F 17/279
704/251

FOREIGN PATENT DOCUMENTS

| JP | H06-096077 A | 4/1994 |
| JP | 2005-328172 A | 11/2005 |

(Continued)

OTHER PUBLICATIONS

Nishimura, R., et al., "Development of Dialog Scenario Editor Aimed at Popularization of Spoken Dialog System", Multimedia, Distributed, Cooperative, and Mobile (DICOMO2013) Symposium (vol. 2013, No. 2), Jul. 3, 2013, pp. 1796-1799.

*Primary Examiner* — Vu B Hang
(74) *Attorney, Agent, or Firm* — Knobbe, Martens, Olson & Bear, LLP

(57) ABSTRACT

According to one embodiment, an edit assisting system includes a server device and a client device. The client device displays a first object, which indicates first speech of a user and a first portion of the first speech, and a second object, which indicates second speech generated by the server device and a second portion of the second speech, on a screen based on a scenario indicated in scenario data. The first and second portions are editable. The client device transmits edit data indicating the first portion which is edited and/or the second portion which is edited to the server device. The server device rewrites the scenario data by changing the first portion of the first speech and/or the second portion of the second speech is the scenario by using the edit data.

18 Claims, 14 Drawing Sheets

(51) Int. Cl.
*G10L 15/18* (2013.01)
*G10L 15/183* (2013.01)

(56) References Cited

FOREIGN PATENT DOCUMENTS

| | | |
|---|---|---|
| JP | 2011-217018 A | 10/2011 |
| JP | 2015-121934 A | 7/2015 |

* cited by examiner

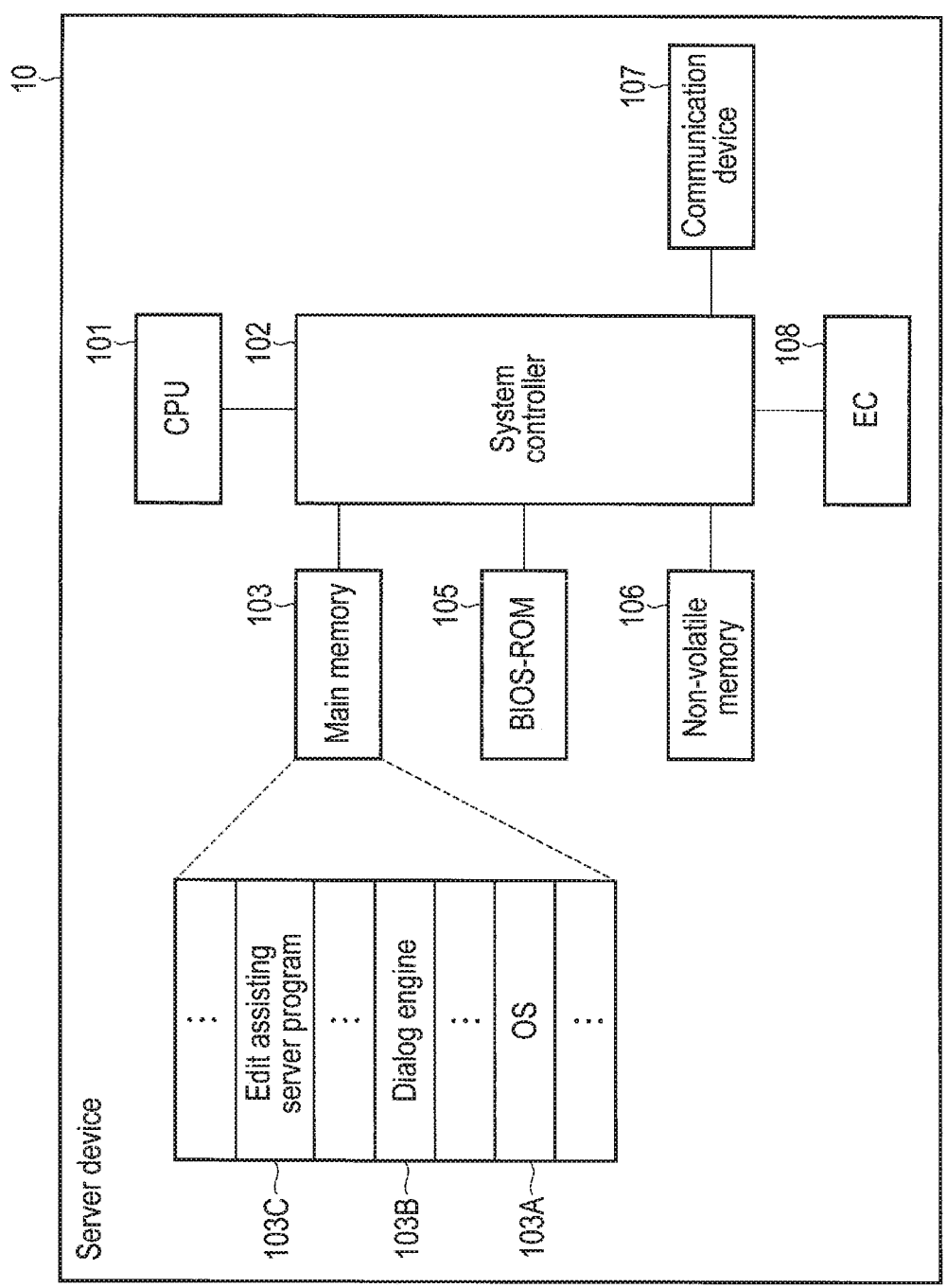
F I G. 2

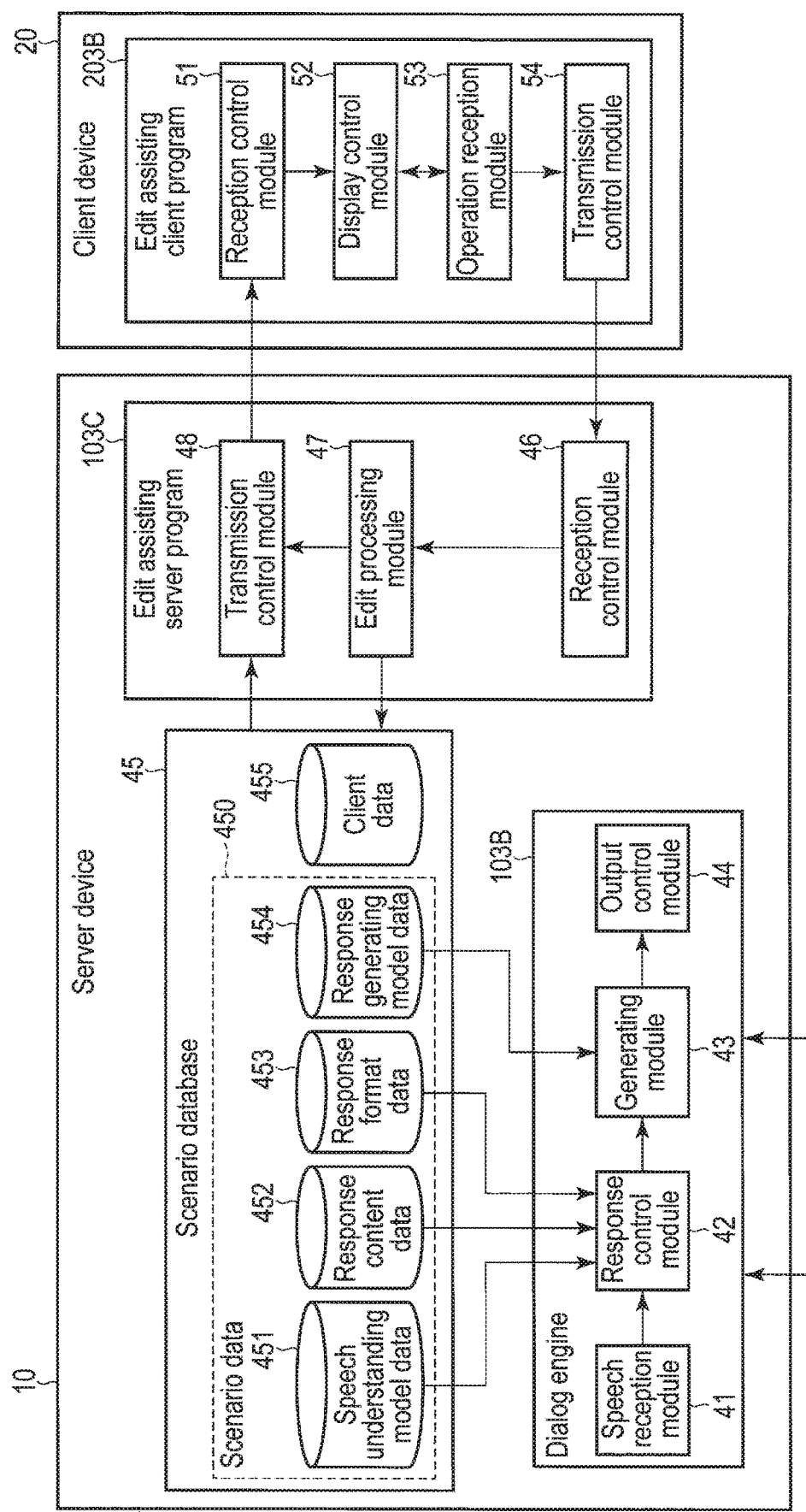
F I G. 4

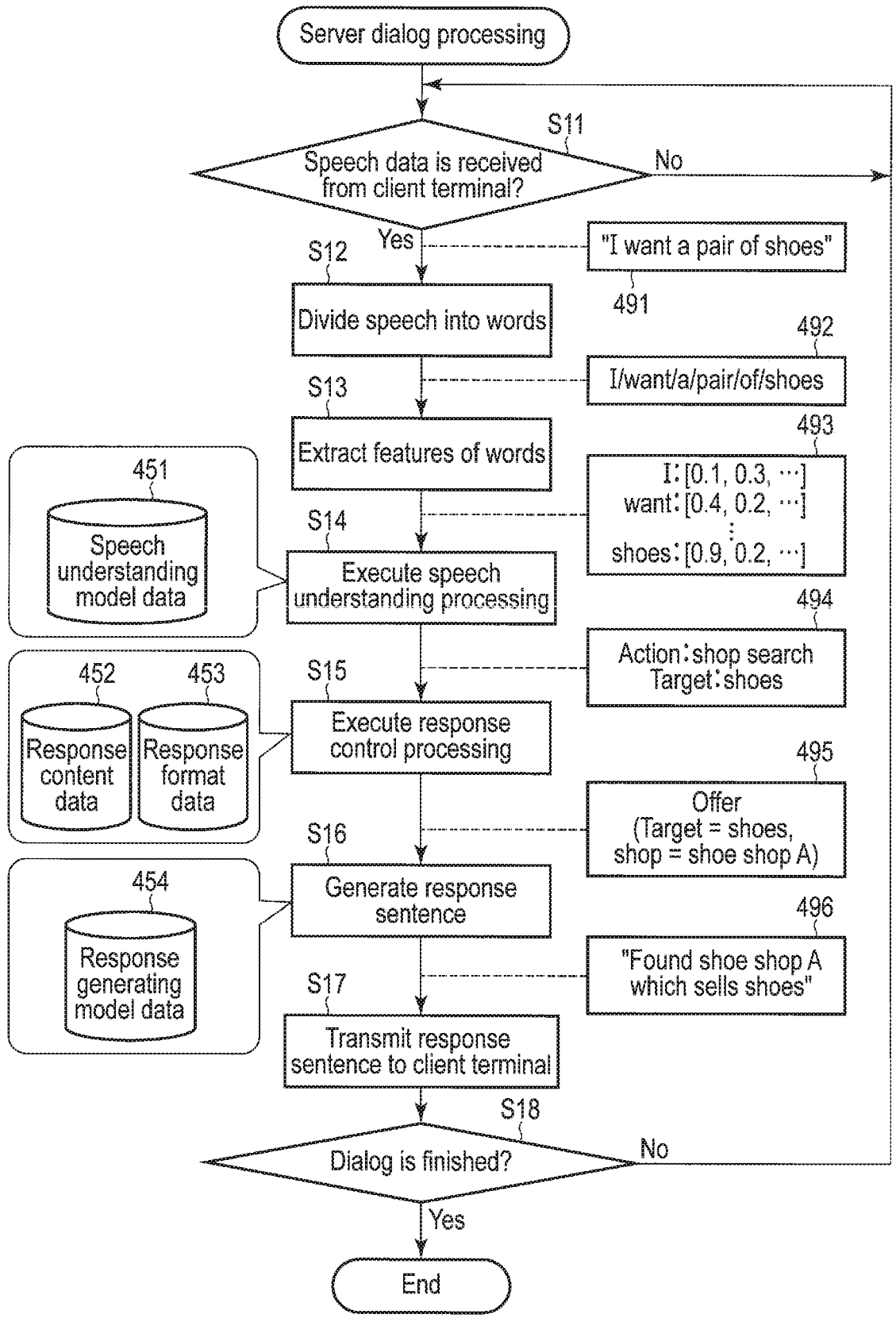
F I G. 5

| Client ID | Scenario data for editing | Authority | ... |
|---|---|---|---|
| ... | ... | ... | ... |
| ... | ... | ... | ... |
| ⋮ | ⋮ | ⋮ | ⋮ |

F I G. 6

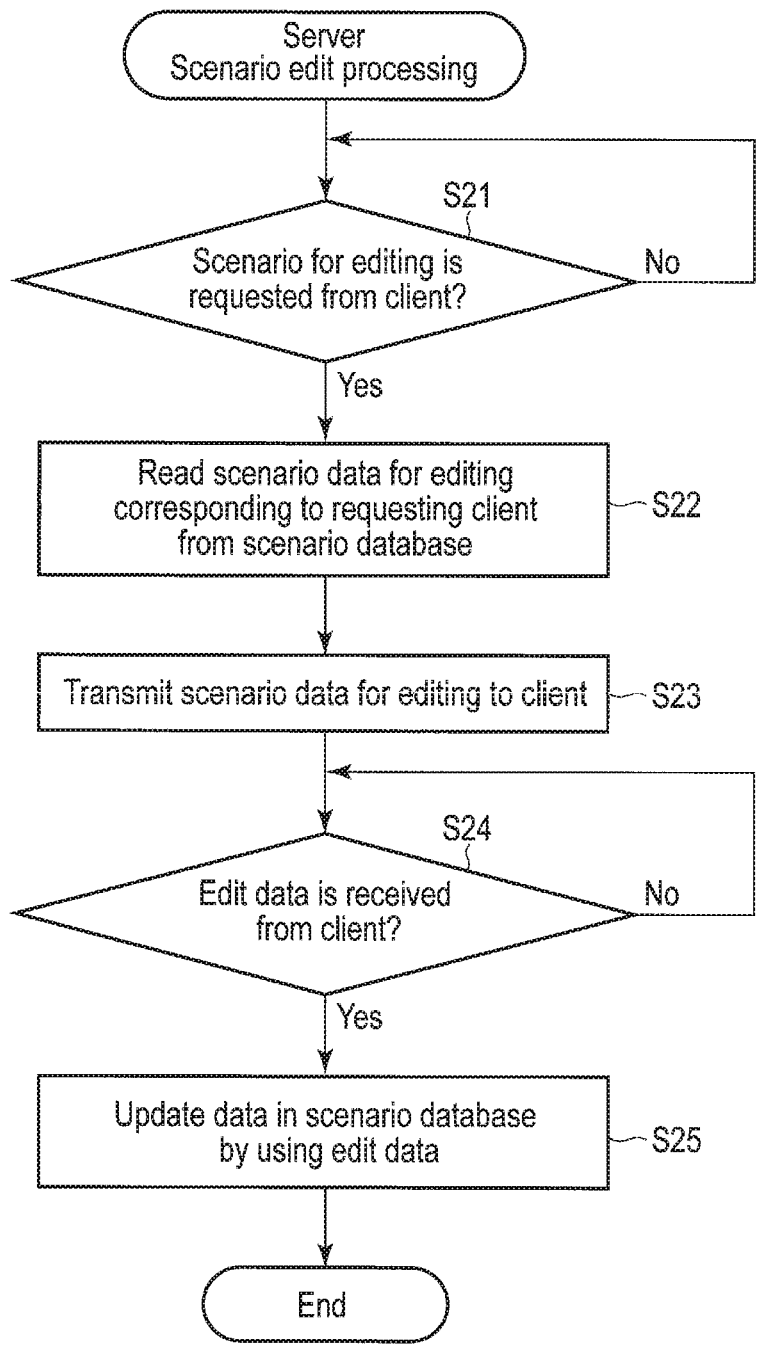
F I G. 13

… (1)

EDIT ASSISTING SYSTEM, EDIT ASSISTING DEVICE AND EDIT ASSISTING METHOD

CROSS-REFERENCE TO RELATED APPLICATIONS

This application is based upon and claims the benefit of priority from Japanese Patent Application No. 2017-055422, filed Mar. 22, 2017, the entire contents of which are incorporated herein by reference.

FIELD

Embodiments described herein relate generally to an edit assisting system, an edit assisting device and an edit assisting method which assist data editing related to a dialog engine.

BACKGROUND

In recent years, various electronic devices including dialog engines which generate responses to users' speeches inputted as voices or texts and output the responses as voices or texts are used. By speaking, for example a question to such an electronic device, each user can obtain an answer for this question.

BRIEF DESCRIPTION OF THE DRAWINGS

FIG. 2 is an exemplary block diagram illustrating a system configuration of a server device provided in the edit assisting system of the embodiment.

FIG. 4 is an exemplary block diagram illustrating functional configurations of the server device in FIG. 2 and the client device in FIG. 3.

FIG. 5 is a flowchart illustrating an example of the procedure of dialog processing executed by the server device in FIG. 2.

FIG. 6 is a view illustrating a configuration example of client data used by the server device in FIG. 2.

FIG. 13 is a flowchart illustrating an example of the procedure of scenario edit processing executed by the server device in FIG. 2.

DETAILED DESCRIPTION

Figure 1:
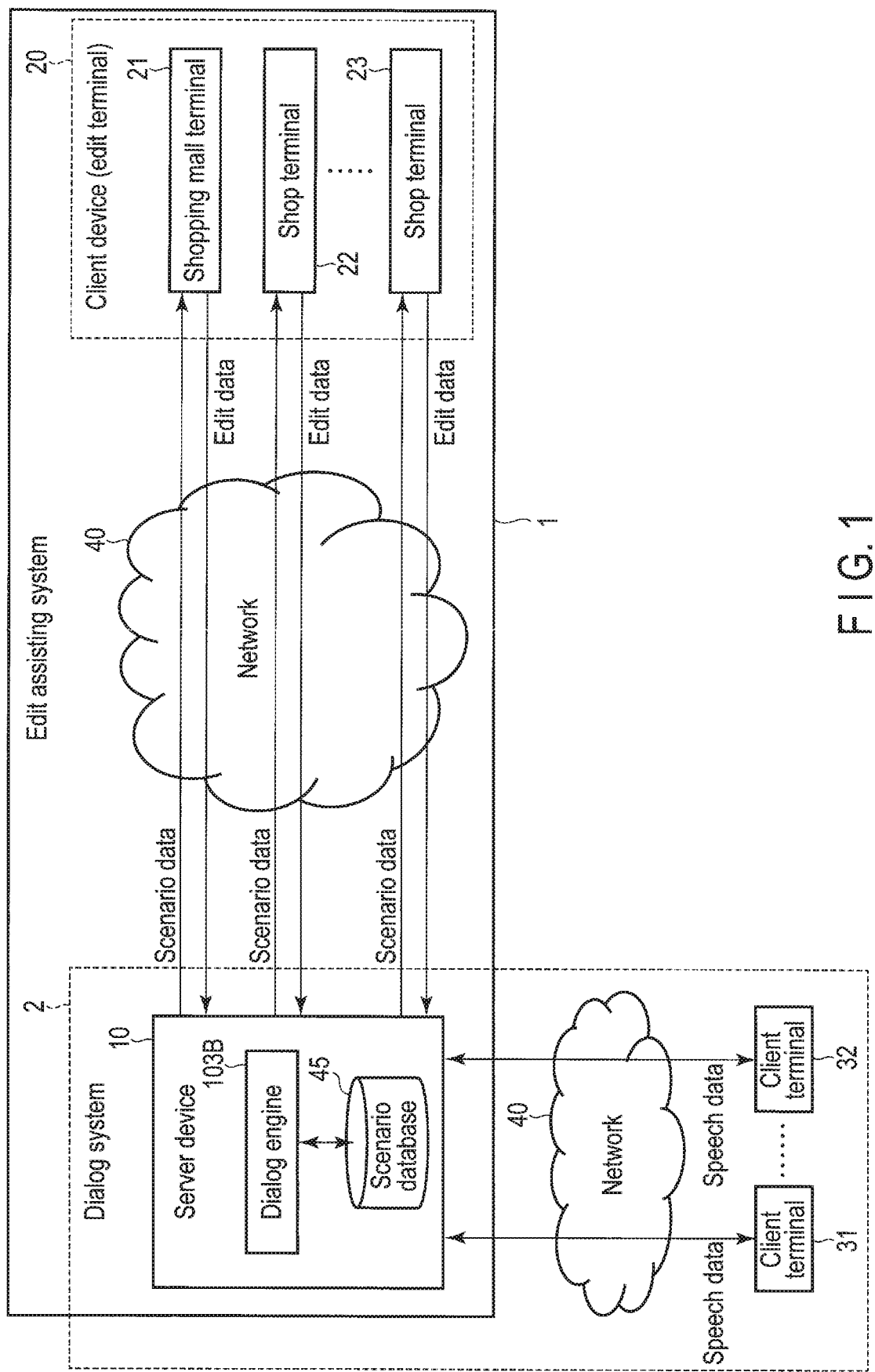
FIG. 1 is an exemplary view for explaining an outline of an edit assisting system according to an embodiment.

Various embodiments will be described hereinafter with reference to the accompanying drawings.

In general, according to one embodiment, an edit assisting system includes a server device and a first client device. The server device stores scenario data in a storage medium to generate, by using first speech data indicative of first speech of a user, second speech data indicative of second speech which responds to the first speech of the user. The scenario data indicates scenarios of dialogs. Each of the dialogs includes the first speech of the user and the second speech generated by the server device. The server device transmits first scenario data indicative of a first scenario of the scenarios to the first client device. The first client device receives the first scenario data from the server device. The first client device displays a first object and a second object on a screen based on the first scenario indicated in the first scenario data. The first Object indicates the first speech of the user and further indicates a first portion of the first speech, and the second object indicates the second speech generated by the server device and further indicates a second portion of the second speech. The first portion and the second portion are editable. The first client device transmits first edit data to the server device when an operation of editing the first portion and/or the second portion is performed by a user who uses the first client device, the first edit data indicative of the edited first portion and/or the edited second portion. The server device receives the first edit data from the first client device and rewrites the first scenario data by changing the first portion of the first speech and/or the second portion of the second speech included in the first scenario by using the first edit data.

First, a configuration of an edit assisting system according to an embodiment will be described with reference to FIG. 1. An edit assisting system 1 assists editing of scenario data which is used by a dialog system 2 for a dialog with a user. The edit assisting system 1 includes a server device 10 and a client device 20. The server device 10 may be realized as a server computer, for example. The client device 20 may be realized as a mobile information terminal such as a smartphone, a tablet computer, a mobile telephone, and PDA, a personal computer, and or an integrated system incorporated into various electronic devices. The server device 10 and the client device 20 can exchange data via a network 40.

The server device 10 includes a dialog engine 103B for a dialog with the user. This dialog engine 103B has a function of understanding contents of user's speech and generating speech which responds to this speech by referring to a scenario database 45 for which dialog rules are defined. The dialog engine 103B realizes the dialog with the user by repeating exchanging speech data such as receiving speech data of the user's speech, outputting speech data of the response which responds to this speech data, and receiving speech data of the user's speech corresponding to the speech data of the response.

The server device 10 constructs the dialog system 2 between the server device 10 and each client terminal 31 and 32 connected via the network 40, by using the dialog engine 103B. The dialog system 2 realizes, for example, a dialog including speech of a user who uses the client terminal 31 or 32 and speech generated by the dialog engine 103B of the server device 10. The client terminal 31 may be realized as a mobile information terminal such as a smartphone, a tablet computer, a mobile telephone, and PDA, a personal computer, and or an integrated system incorporated into various electronic devices. The client terminals 31 and 32 may be install-type terminals which are installed at shopping malls and offices, for example.

As illustrated in FIG. 1, the server device 10 receives speech data indicative of users' speech from the client terminal 31 or 32, and transmits speech data a indicative of speech generated by the dialog engine 103B to the client terminal 31 or 32. By such transmitting and receiving of speech data, it is possible to realize the dialog between the user who uses the client terminal 31 or 32 and the server device 10.

As described above, the edit assisting system 1 of the present embodiment assists editing of scenario data which is used by the dialog system 2 for a dialog with the user. This scenario data is, for example, data in the scenario database 45 to which the dialog engine 103B refers. Further, the client device 20 is an edit terminal which edits the scenario data by working with the server device 10.

When, for example, the dialog system 2 is used by a client who visits a shopping mall, the scenario database 45 includes data for dialogs for providing information related to this shopping mall and information related to each shop in this shopping mall. In such a case, the client device 20 includes, for example, a shopping mall terminal 21 which is used by a manager of the shopping mall, and shop terminals 22 and 23 which are used by managers of respective shops.

When the client device 20 (e.g., the terminals 21, 22 and 23) requests editing of data in the scenario database 45, the server device 10 transmits scenario data for editing (hereinafter, also referred to as edit scenario data) to the client device 20. The client device 20 displays a screen for editing a scenario by using the received edit scenario data. The client device 20 transmits the edit data of the scenario based on a user's (manager's) operation to the server device 10. Then, the server device 10 updates data in she scenario database 45 based on an edit portion and edit contents indicated by the received edit data.

Thus, the scenario database 45 used by the dialog engine 103B may be edited by a manager of the server device 10, and, in addition, the manager of the shopping mall and the manager of each shop in the shopping mall. However, when a manager who does not have a thorough knowledge about a technique related to the dialog engine 103B such as the manager of the Shopping mall or the manager of each shop can freely update the scenario database 45, the update is likely not to allow an appropriate transition of a state of a dialog of a scenario or to generate an inappropriate response. Hence, the update is likely not to allow the dialog engine 103B to adequately operate.

Hence, the edit assisting system 1 of the present embodiment is demanded to realize a new function of editing scenario data for a dialog according to a type of a manager. The edit assisting system 1 performs control to edit speech in a range that the manager who does not have a thorough knowledge about the technique of the dialog engine 103B does not change a state transition for an action (e.g., shop search or location search) intended by a scenario, for example. The edit assisting system 1 controls, for example, an editable (changeable) portion of scenario data according to a type of the manager.

Next, FIG. 2 illustrates a system configuration of the server device 10.

The server device 10 includes a CPU 101, a system controller 102, a main memory 103, BIOS-ROM 105, a non-volatile memory 106, a communication device 107, and an embedded controller (EC) 108.

The CPU 101 is a processor which controls operations of various components in the server device 10. The CPU 101 executes various programs loaded from the non-volatile memory 106, which is a storage device, to the main memory 103. These programs include an operating system (OS) 103A and various application programs. The application programs include the dialog engine 103B and an edit assisting server program 103C. The dialog engine 103B includes instructions for reception of user's speech, speech understanding, dialog control for determining a response format, response generation for generating a specific response sentence according to a response format, and output of a response sentence. The edit assisting server program 103C includes instructions for editing a scenario in coordination with the client device 20. In this regard, the dialog engine 103B and the edit assisting server program 103C realized as software will be described. However, functions corresponding to these programs 103B and 103C may be realized by hardware or may be realized by a combination of hardware and software.

Further, the CPU 101 also executes a basic input/output system (BIOS) stored in the BIOS-ROM 105. The BIOS is a program for hardware control.

The system controller 102 is a device which connects a local bus of the CPU 101 and various components. The system controller 102 includes a memory controller which controls an access of the main memory 103.

The communication device 107 is a device which is configured to execute wired communication or wireless communication. The communication device 107 includes a transmitter which transmits signals and a receiver which receives signals.

The EC 108 is one chip microcomputer which includes an embedded controller for power management. The EC 108 has a function of powering on or powering off the server device 10 according to a user's operation of a power button.

Figure 3:
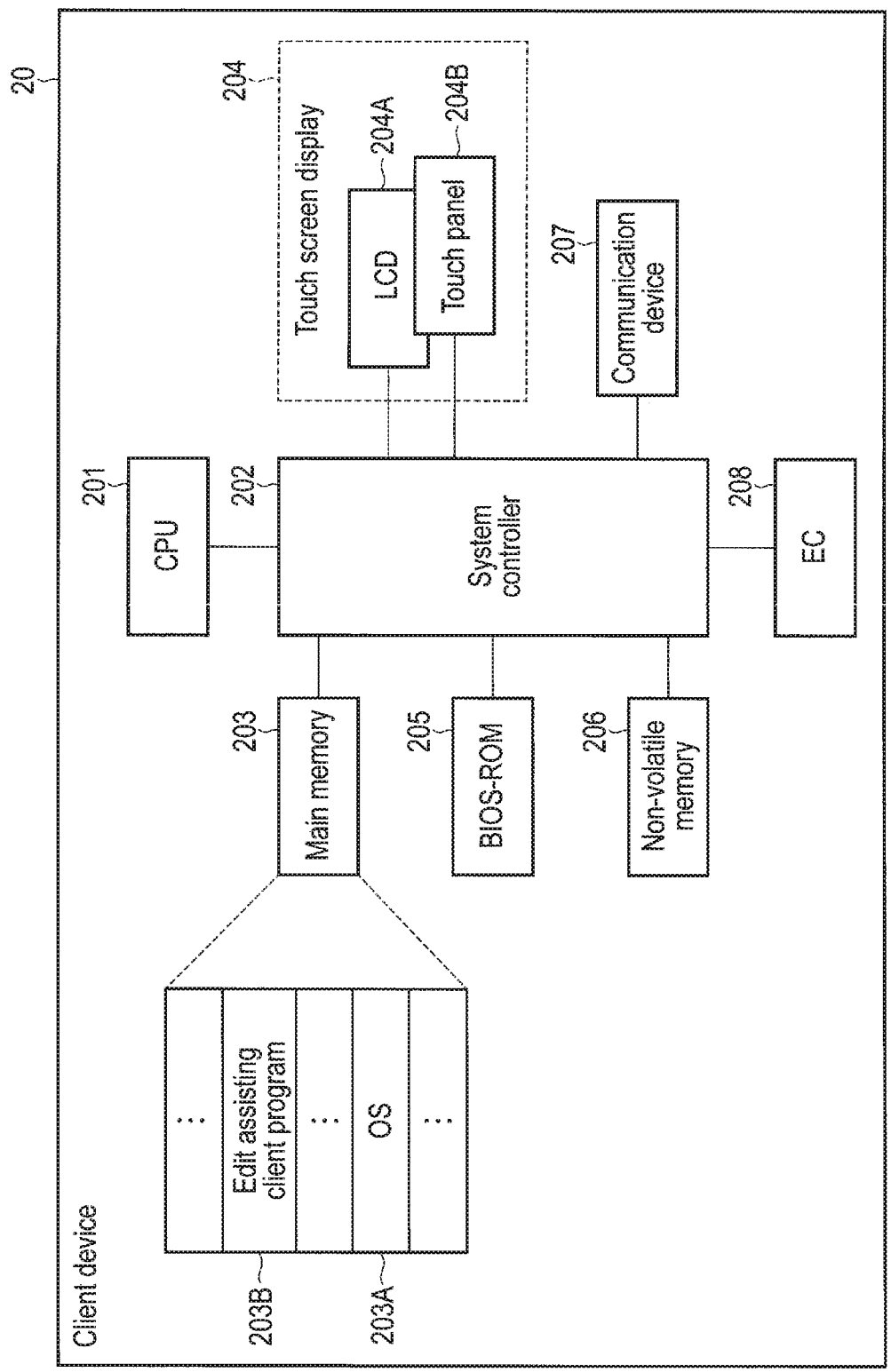
FIG. 3 is an exemplary block diagram illustrating a system configuration of a client device provided in the edit assisting system of the embodiment.

Next, FIG. 3 illustrates a system configuration of the client device 20. Hereinafter, a case where the client device 20 is realized as a tablet computer will be exemplified.

The client device 20 includes a CPU 201, a system controller 202, a main memory 203, BIOS-ROM 205, a non-volatile memory 206, a communication device 207, and an embedded controller (EC) 208.

The CPU 201 is a processor which controls operations of various components in the client device 20. The CPU 201 executes various programs loaded from the non-volatile memory 206, which is a storage device, to the main memory 203. These programs include an operating system (OS) 203A and various application programs. The application programs include an edit assisting client program 203B. This edit assisting client program 203B includes instructions for editing a scenario in coordination with the server device 10. In this regard, the edit assisting client program 203B realized as software will be exemplified. However, functions corresponding to this program 203B may be realized by hardware or may be realized by a combination of hardware and software.

Further, the CPU 201 also executes a basic input/output system (BIOS) stored in the BIOS-ROM 205. The BIOS is a program for hardware control.

The system controller 202 is a device which connects a local bus of the CPU 201 and various components. The system controller 202 includes a memory controller which controls an access of the main memory 203.

Further, the system controller 202 includes a display controller which controls an LCD 204A used as a display monitor of the client device 20. A display signal generated by the display controller is sent to the LCD 204A. The LCD 204A displays a screen image based on the display signal. On an upper surface of the LCD 204A, the such panel 204B as arranged. The touch panel 204B is a capacitance pointing device which is used to make an input on the screen of the LCD 204A. The touch panel 204B detects a touch position on the screen touched by a finger and a motion of the touch position.

The communication device 20 is a device which is configured no execute wired communication or wireless communication. The communication device 207 includes a transmitter which transmits signals and a receiver which receives signals.

The EC 208 is one chip microcomputer which includes an embedded controller for power management. The EC 208 has a function of powering on or powering off the client device 20 according to a user's operation of the power button.

In this regard, the client terminals 31 and 32 may employ, for example, the same system configuration as that of the client device 20. CPUs of the client terminals 31 and 32 are each configured to execute an application program for exchanging speech data to and from the dialog engine 103B on the server device 10.

Next, FIG. 4 illustrates functional configurations of the server device 10 and the client device 20.

First, the dialog engine 103B executed by the server device 10 includes a speech reception module 41, a response control module 42, a generating module 43 and an output control module 44. Further, the server device 10 includes the scenario database 45. For example, a storage area in the non-volatile memory 106 is allocated to the scenario database 45. The scenario database 45 includes scenario data 450 for generating, by using speech data indicative of user's speech, speech data indicative of speech responding to the user's speech, and client data 455 related to the client device 20 for editing the scenario data 450. The scenario data 450 indicates scenarios of dialogs which respectively define user's speech and speech generated by the server device 10 (dialog engine 103B). The scenario data 450 includes, for example, speech understanding model data 451, response content data 452, response format data 453, and response generating model data 454.

The speech understanding model data 451 includes information for estimating a state of a dialog and understanding speech. The speech understanding model data 451 is used to, for example, generate speech intention information indicative of an intention of speech. The speech understanding model data 451 includes, for example, speech expression including one or more words, a feature (e.g., audio feature) corresponding to this speech expression, and speech intention information indicative of contents intended by this speech expression that are associated. The feature includes, for example, a feature vector.

More specifically, the speech understanding model data 451 includes, for example, speech expression "want", a feature corresponding to this speech expression, and speech intention information indicating a user's action of "shop search" that are associated. Further, the speech understanding model data 451 includes, for example, speech expression "where", a feature corresponding to this speech expression, and speech intention information indicating a user's action of "location search" that are associated. Furthermore, the speech understanding model data 451 includes, for example, speech expression "shoes", a feature corresponding to this speech expression, and speech intention information indicating a target as "shoes" that are associated. Still further, the speech understanding model data 451 includes, for example, speech expression "rest room", a feature corresponding to this speech expression, and speech intention information indicating a target as "rest room" that are associated.

The response content data 452 includes information provided as a response to user's speech. When, for example, the dialog engine 103B is used for a dialog for providing various pieces of information related to a shop, the response content data 452 includes shop information which includes a shop name, a line of goods, a price range, business hours, and a location that are associated. The response content data 452 includes, for example, a shop name "shop A", the line of goods indicating "leather shoes" and "sneakers", and the price range indicating "high-end" that are associated.

The response format data 453 includes information for determining a format of a response sentence (response format) based on the speech intention information. The response format includes, for example, a demand, greetings, a request, a response, an offer, a confirmation, and an answer.

More specifically, the response format data 453 includes, for example, a combination of an action "unknown" and a target "unknown" and a request format (request (X=action, Y=target)) that are associated. Further, the response format data 453 includes, for example, a combination of an action "shop search" and a target "unknown" and an offer format (offer (X=target, Y=shop)) that are associated. Still further, the response format data 453 includes, for example, a combination of an action "location search" and a target "unknown" and a request format (request (X=target)) that are associated.

The response generating model data 454 includes information for generating a response sentence. The response generating model data 454 includes, for example, a response format and a response sentence that are associated.

More specifically, the response generating model data 454 includes, for example, a request format (request (X=target)) and a response sentence "Do you have any request for X" that are associated. Further, the response generating model data 454 includes, for example, a confirmation format (confirm (X=x)), and a response sentence "Do you mean that X is x" that are associated. Furthermore, the response generating model data 454 includes, for example, an offer format (offer (X=target, Y=shop)) and a response sentence "Found shop Y which sells X" that are associated.

The dialog engine 103B transmits and receives speech data to and from the client terminals 31 and 32 by using the speech understanding model data 451, the response content data 452, the response format data 453 and the response generating model data 454.

More specifically, the speech reception module 41 receives the speech data from the client terminals 31 and 32 used by the users via the communication device 107. The speech data indicates user's speech. The speech data has an arbitrary data format and is, for example, voice data, voice feature data or text data. When the speech data is voice data, the speech reception module 41 may extract features by using the voice data or may obtain text data indicative of speech by subjecting voice recognition processing to the voice data.

The response control module 42 specifies speech intention information associated with speech expression included in speech data by using the speech understanding model data 451 to estimate an intention of the user's speech. When, for example, speech includes speech expression "shoes" and speech expression "want", the response control module 42 specifies speech intention information indicating a target "shoes" and speech intention information indicating an action "shop search". That is, the response control module 42 can estimate the intention of the user's speech as "shop search" for "shoes" based on speech expression "I want a pair of shoes".

Next, the response control module 42 determines a response format based on the specified speech intention information by using the response format data 453 and the response content data 452. By using the response format data 453 and the response content data 452, the response control module 42 determines, for example, an offer format (offer (X=shoes, Y=shoe shop A)) as the response format based on the speech intention information indicating the target "shoes" and the speech intention information indicating the action "shop search".

The generating module 43 generates a response sentence based on the determined response format by using the response generating model data 454. More specifically, the generating module 43 generates, for example, a response sentence "Found shoe shop A which sells shoes" corresponding to the offer format (offer (X=shoes, Y=shoe shop A)).

The output control module 44 outputs the generated response sentence. The output control module 44 can out the response sentence in any format. The output control module 44 transmits, for example, read-aloud voice data of die response sentence to the client terminals 31 or 32 which is a transmission source of user's speech data. Further, the output control module 44 may transmit text data indicating the response sentence to the client terminal 31 or 32. Furthermore, the output control module 44 may transmit, for example, both the read-aloud voice data of the response sentence and text data indicating the response sentence to the client terminals 31 or 32.

An example of the procedure of dialog processing executed by the server device 10 will be described with reference to a flowchart in FIG. 5. This dialog processing is realized by, for example, executing instructions included in the dialog engine 103B by the CPU 101 of the server device 10.

First, the speech reception module 41 determines whether speech data of user's speech is received from the client terminal 31 or 32 (step S11). When the speech data is not received (No in step S11), it is determined again whether the speech data has been received by returning to step S11.

When the speech data has been received (Yes in step S11), the response control module 42 divides this speech data 491 into words and generates divided data 492 (step S12). The speech data 491 includes, for example, voice data corresponding to speech "I want a pair of shoes". The response control module 42 analyzes this speech data 491 to generate divided data 492 indicating words "I", "want", "a", "pair", "of" and "shoes" included in the speech.

The response control module 42 extracts a feature 493 of each word included in the divided data 492 (step S13). The feature 493 of each word includes, for example, a feature vector.

Next, the response control module 42 executes speech understanding processing by using the speech understanding model data 451 (step S14). The response control module 42 generates speech intention information 494 from the feature 493 by executing the speech understanding processing. This speech intention information 494 includes information indicating an action and a target intended by speech, and includes information which indicates, for example, the action "shop search" and the target "shoes".

Further, the response control module 42 executes response control processing by using the response content data 452 and the response format data 453 (step S15). The response control module 42 determines a response format 495 based on the features 493 and the speech intention information 494 by executing the response control processing. The response format 495 includes information indicating a response type and response contents (e.g., a target, a shop and the like), and includes, for example, information which indicates that a type is "offer", a target is "shoes" and a shop is "shop A".

The generating module 43 generates a response sentence 496 based on the response format 495 by using the response generating model data 454 (step S16). The generating module 43 generates, for example, "Found shoe shop A which sells shoes" as the specific response sentence 496 for informing the user of contents of the response format 495.

The output control module 44 transmits the response sentence 496 to the client terminal 31 or 32 via the communication device 107 (step S17). The output control module 44 may transmit this response sentence 496 as voice data or as text data. The client terminal 31 or 32 may output this response sentence 496 as voice from a speaker or earphones or may display this response sentence 496 as a text on the screen of the display.

Next, the speech reception module 41 determines whether the dialog has been finished (step S18). When the dialog is not finished (No in step S18), the process returns to step S11. When the dialog has been finished (Yes in step S18), this dialog processing is finished.

Consequently, it is possibly to perform the dialog processing between the server device 10 and the client terminals 31 and 32 which configure the dialog system 2.

Back to FIG. 4, a functional configuration of the edit assisting server program 103C executed by the server device 10 will be described. The edit assisting server program 103C includes a reception control module 46, a transmission control module 48 and an edit processing module 47.

The reception control module 46 receives, for example, a request for scenario data for editing (edit scenario data) from the client device 20 via the communication device 107.

In response to this request, the edit processing module 47 and the transmission control module 48 transmit the edit scenario data corresponding to at least one scenario to the client device 20. More specifically, the edit processing module 47 obtains the edit scenario data corresponding to the requesting client device 20. The edit processing module 47 refers to, for example, the client data 455 and then reads specific edit scenario data from the scenario database 45 based on a client ID allocated to the client device 20 and an authority given to the client device 20.

FIG. 6 illustrates a configuration example of the client data 455. The client data 455 includes records corresponding to client devices 20. Each record includes, for example, a client ID, edit scenario data and an authority.

In a record corresponding to a client device 20, the "client ID" indicates identification information allocated to this client device 20. In this regard, identification information allocated to the user (manager) who uses the client device 20 may be set to the "client ID".

The "edit scenario data" indicates edit scenario data for the client device 20. More specifically, for example, a storage location of the edit scenario data (e.g., a file name and a file path) may be set to the "edit scenario data". Further, information for specifying data used as the edit scenario data among the speech understanding model data 451, the response content data 452, the response format data 453 and the response generating model data 454 may be set to the "edit scenario data". Furthermore, information for generating the edit scenario data by using at least one of the speech understanding model data 451, the response content data 452, the response format data 453 and the response generating model data 454 may be set to the "edit scenario data".

The "authority" indicates an authority of scenario editing given to the client device 20. For example, an authority level of the client device 20 is set to the "authority". The edit assisting system 1 can control a portion which can be edited (editable portion) and a portion which cannot be edited (uneditable portion) in a scenario according to this authority level.

By using this client data 455, the edit processing module 47 can acquire edit scenario data according to the requesting client device 20. The edit scenario data is part of the scenario data 450, and indicates a scenario at least part of which can be edited by the user who uses the client device 20. In this regard, this edit scenario data may be created in advance. Alternatively, in response to a request from the client device 20, the edit processing module 47 may read specific data as the edit scenario data from the scenario data 450 (i.e., the speech understanding model data 451, the response content data 452, the response format data 453 and the response generating model data 454). Further, the edit processing module 47 may generate the edit scenario data by using the scenario data 450 in response to the request.

The transmission control module 48 transmits the acquired edit scenario data to the client device 20 via the communication device 107. By this means, the server device 10 can cause the client device 20 to display a scenario edit screen based on this edit scenario data and present one or more objects for editing.

The reception control module 46 receives edit data indicating the edited scenario from the client device 20. The edit processing module 47 updates data in the scenario database 45 by using this edit data. The edit data indicates, for example, a portion of scenario indicated in the transmitted edit scenario data which is edited by the user of the client device 20, edit contents of the edited portion, a portion added to the scenario by the user of the client device 20 and addition contents of the added portion. The edit processing module 47 rewrites (updates) the scenario data 450 based on this edit data. For example, based on an edited portion of the scenario and edit contents of the edited portion, the edit processing module 47 rewrites corresponding data included in at least one of the speech understanding model data 451, the response content data 452, the response format data 453 and the response generating model data 454.

According to the above configuration, the edit assisting system 1 can rewrite the scenario data 450 in accordance with editing performed by the user of the client device 20. As a result, the dialog system 2 can perform a dialog between the server device 10 and the client terminal 31 or based on the rewritten scenario data 450.

Next, a functional configuration of the edit assisting client program 203B executed by the client device 20 will be described. The edit assisting client program 203B includes a reception control module 51, a display control module 52, an operation receiving module 53 and a transmission control module 54.

The operation receiving module 53 receives various operations of a user who uses the client device 20. The operation receiving module 53 receives, for example, an operation of requesting edit scenario data. In a case where, for example, the edit assisting client program 203B is activated or the user performs a specific operation, the operation receiving module 53 determines that edit scenario data has been requested.

In a case where the edit scenario data has been requested, the transmission control module 54 requests the edit scenario data for the server device 10 via the communication device 207. The reception control module 51 receives the edit scenario data from the server device 10 via the communication device 207.

The display control module 52 displays the scenario edit screen on the LCD 204A by using the received edit scenario data. The display control module 52 displays (presents) on the screen of the LCD 204A, for example, a first object which indicates first speech of the user and indicates a first portion of the first speech, and a second object which indicates second speech generated by the server device 10 and indicates a second portion of the second speech. The first portion and the second portion can be edited, that is, they are editable portions. An example of the scenario edit screen will be described below with reference to FIGS. 7 to 12.

Further, the operation receiving module 53 and the display control module 52 receive scenario editing according to an operation on the displayed scenario edit screen. This operation is, for example, an operation of using a keyboard or a pointing device such as the touch panel 204B. The display control module 52 may chance at least part of the object indicating speech on the scenario edit screen according to a user's operation, or may add a new object indicating speech on the scenario edit screen. Further, the operation receiving module 53 generates edit data indicating an edited portion on the scenario and edit contents based on the user's operation.

The edit data includes, for example, data indicating a changed portion of an object or change contents when at least part of the object on the scenario edit screen is changed by the user of the client device 20, and includes an added portion and addition contents when the object is added on the scenario edit screen by the user. As described above, the server device 10 can update data in the scenario database 45 based on this edit data.

In this regard, a scenario indicated by scenario data may include not only speech but also an image. The image is, for example, an image displayed on the screen of the client terminals 31 or 32 according to speech which responds user's speech. For the image, an image of a character of a shopping mall or each shop may be used, for example. Consequently, the edit assisting system 1 can also edit (change) the image, similar to the speech included in the scenario.

Hereinafter, some examples of specific operations of the edit assisting system 1 will be described.

First, a case where the edit processing module 47 and the transmission control module 48 of the server device 10 transmit first scenario data indicating a first scenario of a dialog including user's speech and speech generated by the server device 10 (dialog engine 103B) to the shopping mall terminal 21 (first client device) will be exemplified. This first scenario data may include information indicating the first portion of the user's first speech and a second portion of second speech which is generated by the server device 10. These first portion and second portion can be edited by the user of the shopping mall terminal 21. These first portion and second portion can be arbitrarily set according to, for example, a type of the client device 20 and/or a type of the user who uses the client device 20.

The reception control module 51 of the shopping mall terminal 21 receives the first scenario data. Based on the first scenario indicated in the first scenario data, the display control module 52 displays a first object and a second object on the screen of the LCD 204A. The first object indicates first speech of the user and further indicates the editable first portion of the first speech. The second object indicates second speech generated by the server device 10 and further indicates the editable second portion of the second speech. When an operation of editing at least one of the first portion and the second portion is performed by the user who uses the shopping mall terminal 21, the operation receiving module 53 and the transmission control module 54 transmit first edit data indicative of the edited first portion and/or the edited second portion to the server device 10.

The reception control module 46 of the server device 10 receives the first edit data. The edit processing module 47 rewrites the first scenario data by changing the first portion of the first speech and/or the second portion of the second speech included in the first scenario by using this first edit data.

Consequently, it possible to perform control to allow the user of the shopping mall terminal 21 to edit only the first portion and the second portion in the first scenario.

In this regard, the first scenario data may include information indicative of a third portion of the first speech which cannot be edited by the user of the shopping mall terminal 21, and a fourth portion of the second speech which cannot be edited by the user of the shopping mall terminal 21. That is, these third portion and fourth portion are uneditable portions. In this case, the first object displayed by the display control module 52 of the shopping mall terminal 21 may further indicate the third portion of the first speech which cannot be edited, and the second object may further indicate the fourth portion of the second speech which cannot be edited.

Further, the first scenario data may include information indicating a position at which new speech can be added to a dialog of the first scenario. In this case, the display control module 52 of the shopping mall terminal 21 displays a fifth object for adding new speech to the first scenario on the screen. When the user who uses the shopping mall terminal 21 performs an operation of adding third speech by using this fifth object, the operation receiving module 53 and the transmission control module 54 transmit additional data indicating the third speech to the server device 10.

The reception control module 46 of the server device 10 receives the additional data. The edit processing module 47 rewrites the first scenario data to add the third speech to the first scenario by using this additional data.

Consequently, it is possible to add new speech to the first scenario, and control a position at which the new speech is added.

Next, a case where the edit processing module 47 and the transmission control module 48 of the server device 10 transmit the first scenario data to the shop terminal 22 (second client device) will be exemplified. This first scenario data to be transmitted may include information indicative of a fifth portion of user's first speech and a sixth portion of the second speech which is generated by the server device 10. These fifth portion and sixth portion can be edited by the user who uses the shop terminal 22. The first portion of the first speech which can be edited by the user who uses the shopping mall terminal 21 may differ from the fifth portion of the first speech which can be edited by the user who uses the shop terminal 22. Similarly, the second portion of the second speech which can be edited by the user who uses the shopping mall terminal 21 may differ from the sixth portion of the second speech which can be edited by the user who uses the shop terminal 22. This is because an authority which allows the user who uses the shopping mall terminal 21 to edit (change) the first scenario, and an authority which allows the user who uses the shop terminal 22 to edit the first scenario are different.

The display control module 52 of the shop terminal 22 displays the third object which indicates the first speech and further indicates the fifth portion, and the fourth object which indicates the second speech and further indicates the sixth portion, on the screen of the LCD 204A based on the first scenario indicated in the first scenario data.

When an operation of editing the fifth portion and/or the sixth portion is performed by the user who uses the shop terminal 22, the operation receiving module 53 transmits second edit data indicative of the edited fifth portion and/or the edited sixth portion to the server device 10.

The reception control module 46 of the server device 10 receives the second edit data. The edit processing module 47 rewrites the first scenario data by changing the fifth portion of the first speech and/or the sixth portion of the second speech included in the first scenario by using this second edit data.

Consequently, it is possible to perform control to allow the user of the shop terminal 22 to edit only the fifth portion and the sixth portion in the first scenario.

Next, a case where the edit processing module 47 and the transmission control module 48 of the server device 10 transmit the first scenario data indicative of the first scenario and second scenario data indicative of a second scenario of a dialog including the first speech to the shopping mall terminal 21 will be exemplified. That is, the first scenario and the second scenario both include the first speech.

The reception control module 51 of the shopping mall terminal 21 receives the first scenario data and the second scenario data from the server device 10. The display control module 52 displays a first page which is based on the first scenario indicated in the first scenario data and includes the first object and the second object, on the screen of the LCD 204A. As described above, the first object indicates the first speech of the user and the first portion of the first speech which can be edited. Further, the second object indicates the second speech generated by the server device 10, and indicates the second portion of the second speech which can be edited.

After an operation of editing the first portion is performed by the user who uses the shopping mall terminal 21, the operation receiving module 53 and the display control module 52 display a second page including a sixth object on the screen based on the second scenario indicated in the second scenario data. The sixth object indicates the first speech and further indicates third portion of the first speech which is can be edited and is changed based on the edit contents of the first portion.

More specifically, the operation receiving module 53 receives an operation for editing the first portion by the user who uses the shopping mall terminal 21, and the display control module 52 displays the edited first portion. After that, when an operation of displaying the second page based on the second scenario indicated in the second scenario data is performed by the user who uses the shopping mall terminal 21, the operation receiving module 53 displays the sixth object which indicates the first speech and indicates third portion of the first speech which can be edited and is changed based on edit contents of the first portion, on the screen based on the second scenario. Further, the transmission control module 54 transmits third edit data indicative of the edited first portion and the changed third portion to the server device 10.

The reception control module 46 of the server device 10 receives the third edit data from the shopping mall terminal 21. By using this third edit data, the edit processing module 47 rewrites the first scenario data by changing the first portion of the first speech included in the first scenario and rewrites the second scenario data by changing the third portion of the first speech included in the second scenario.

According to such a configuration, since the edit contents of the first page based on the first scenario is reflected in the second page based on the second scenario, it is possible to reduce complexity of user's edit work.

Next, FIGS. 7 to 12 illustrate some examples of the scenario edit screen displayed by the client device 20.

Figure 7:
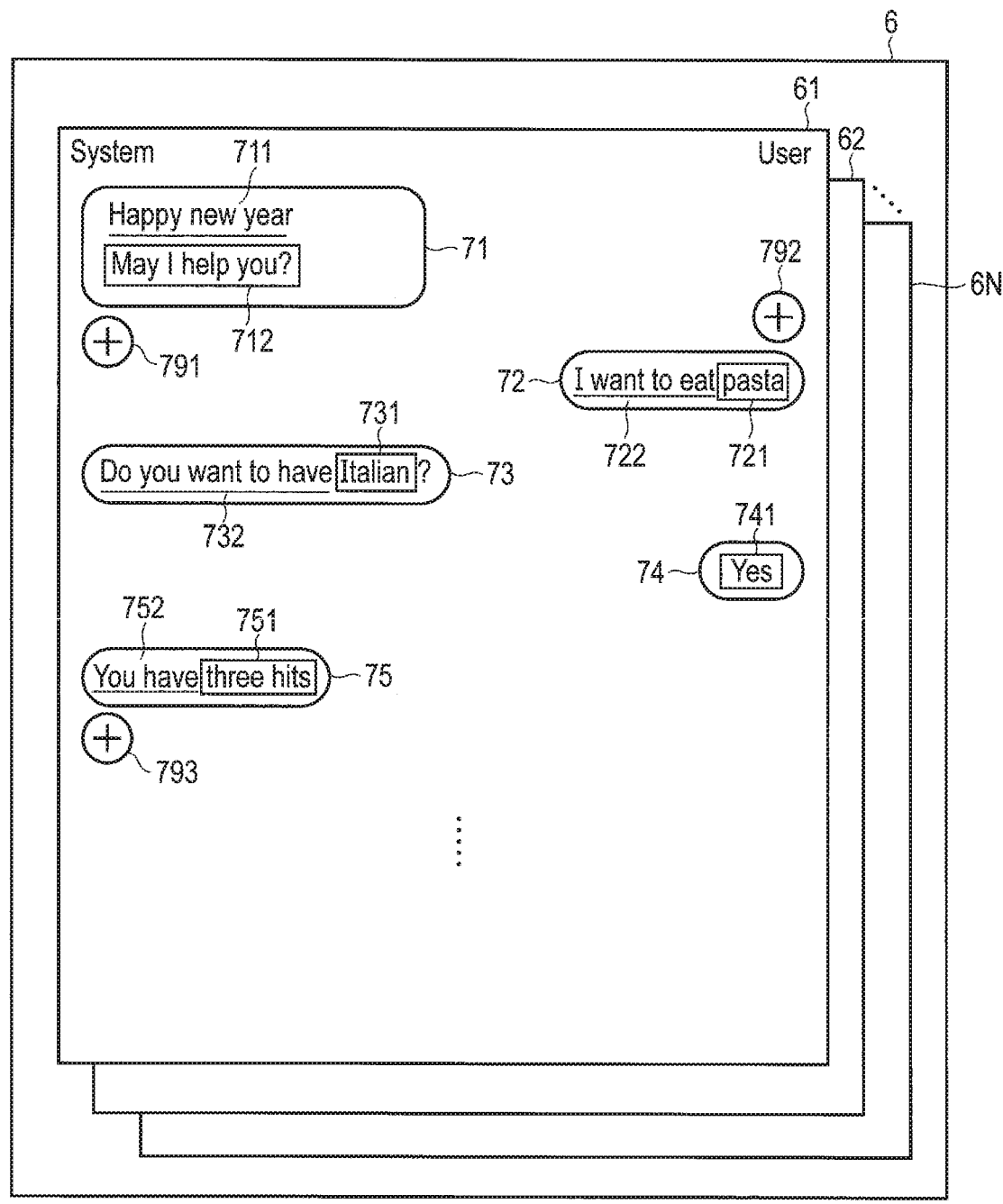
FIG. 7 is a view illustrating a first example of a scenario edit screen displayed by the client device in FIG. 3.

First, a scenario edit screen 6 illustrated in FIG. 7 includes scenario edit pages 61, 62 and 6N for editing scenarios, respectively. These scenario edit pages 61, 62 and 6N are associated with, for example, the scenarios, which use a template of the same type, respectively. The template is, for example, a template which defines at least one of speech and a state transition. The scenario edit pages 61, 62 and 6N are arranged in the scenario edit screen 6 such that the pages 61, 62 and 6N are overlapped. The user can arrange a given page at an uppermost portion of the scenario edit pages 61, 62 and 6N by performing an operation of selecting one page of the scenario edit pages 61, 62 and 6N such as an operation of tapping one position of the given page. The user can perform an operation of editing a scenario of the one page arranged at the uppermost portion.

In each of the scenario edit pages 61, 62 and 6N, speech can be edited in a range that a state transition for an action (e.g., shop search or location search) intended by this scenario is not changed. This speech edit includes, for example, changing speech contents and adding speech.

As illustrated in FIG. 7, the first scenario edit page 61 arranged at the uppermost portion includes speech objects 71, 73 and 75 indicating speech generated by a system (i.e., speech generated by the server device 10) on a left side of the page, and includes speech objects 72 and 74 indicating user's speech on a right side of the page. The first scenario edit page 61 includes addition objects 791 and 793 for adding speech generated by the system on the left side of the page, and includes an addition object 792 for adding user's speech on the right side of the page. The addition objects 791, 792 and 793 are arranged at, for example, positions at which speech can be added in the scenario.

The respective speech objects 71 to 75 indicate portions 711, 722, 732 and 752 which can be edited by the user, and portions 712, 721, 731, 741 and 751 which cannot be edited by the user in the text indicating speech contents. For example, in the speech object 71, the editable portion "Happy new year" 711 and the uneditable portion "May I help you?" 712 are indicated.

The editable portions 711, 722, 732 and 752 and the uneditable portions 712, 721, 731, 741 and 751 are displayed to be identified by the user. In an example illustrated in FIG. 7, the editable portions 711, 722, 732 and 752 are underlined, and the uneditable portions 712, 721, 731, 741 and 751 are surrounded by rectangles. A display format for identifying the editable portions 711, 722, 732 and 752 and the uneditable portions 712, 721, 731, 741 and 751 are not limited to this example. Display formats which make it possible to identify the these two types such as different colors, highlights and bold types may be employed.

Further, in response to a user's specific operation for a portion of the editable portions 711, 722, 732 and 752, a cursor may be arranged at the portion to start editing a text which represents speech contents. In this regard, any operation for the uneditable portions 712, 721, 731, 741 and 751 may not be accepted. Consequently, it is possible to perform control to edit a scenario within a range of an authority given to the user of the client device 20.

When, for example, the user is a manager of a shopping mall, the user can perform an operation of changing the editable portion "Happy new year" 711 included in the object 71 to "Spring has come" to change season's greetings set to a sale period at a begging of a year to greetings in a sale period of spring.

Figure 8:
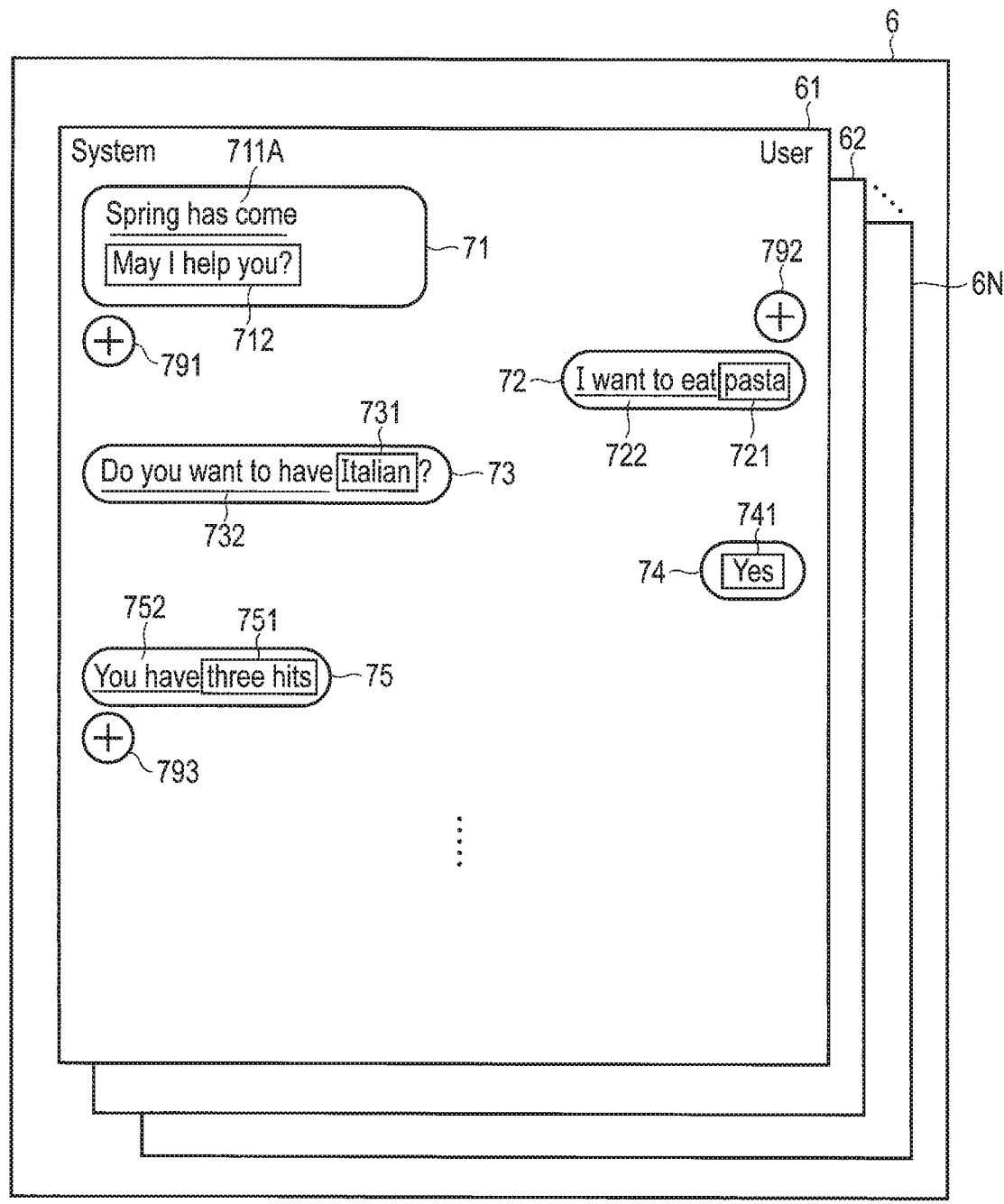
FIG. 8 is a view illustrating a second example of the scenario edit screen displayed by the client device in FIG. 3.

As illustrated in FIG. 8, the editable portion "Happy new year" 711 is changed to "Spring has come" 711A. This editable portion 711A may be displayed by, for example, a different color, highlighting or a bold type to make it possible to identify the change. The user may further change this editable portion 711A.

These scenario edit pages 61, 62 and 6N are associated with, for example, scenarios which use a template of the same type or scenarios which include the same speech. Hence, the change to the editable portion 711 on the first scenario edit page 61 may be reflected in portions corresponding to the other scenario edit pages 62 and 6N. By this means, as illustrated in FIG. 9, an editable portion "Spring has come" 811A corresponding to season's greetings is indicated in an object 81 on the second scenario edit page 62.

Further, when, for example, the user is a manager of a shop in a shopping mall, the user can change a specific value included in speech such as a value of a discount rate of a product which fluctuates per period defined by a month, a week, a day or a time, or change an end of words (or parlance) of speech to change a speech impression to an impression based on a shop concept (e.g., a polite impression or a casual impression). Furthermore, the manager of this shop can disable a change of speech including information of the entire shopping mall or information of other shops.

Figure 9:
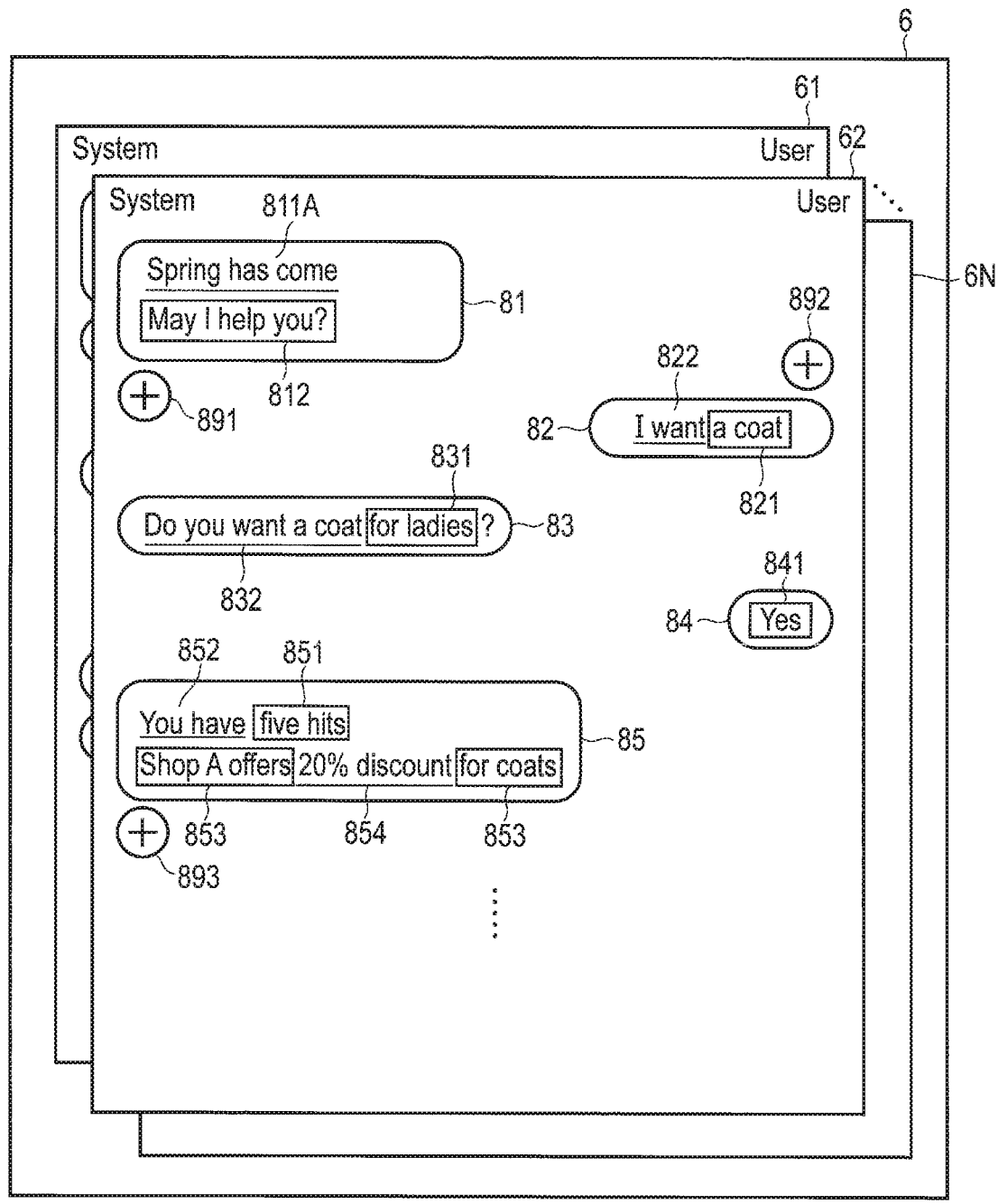
FIG. 9 is a view illustrating a third example of the scenario edit screen displayed by the client device in FIG. 3.
Figure 10:
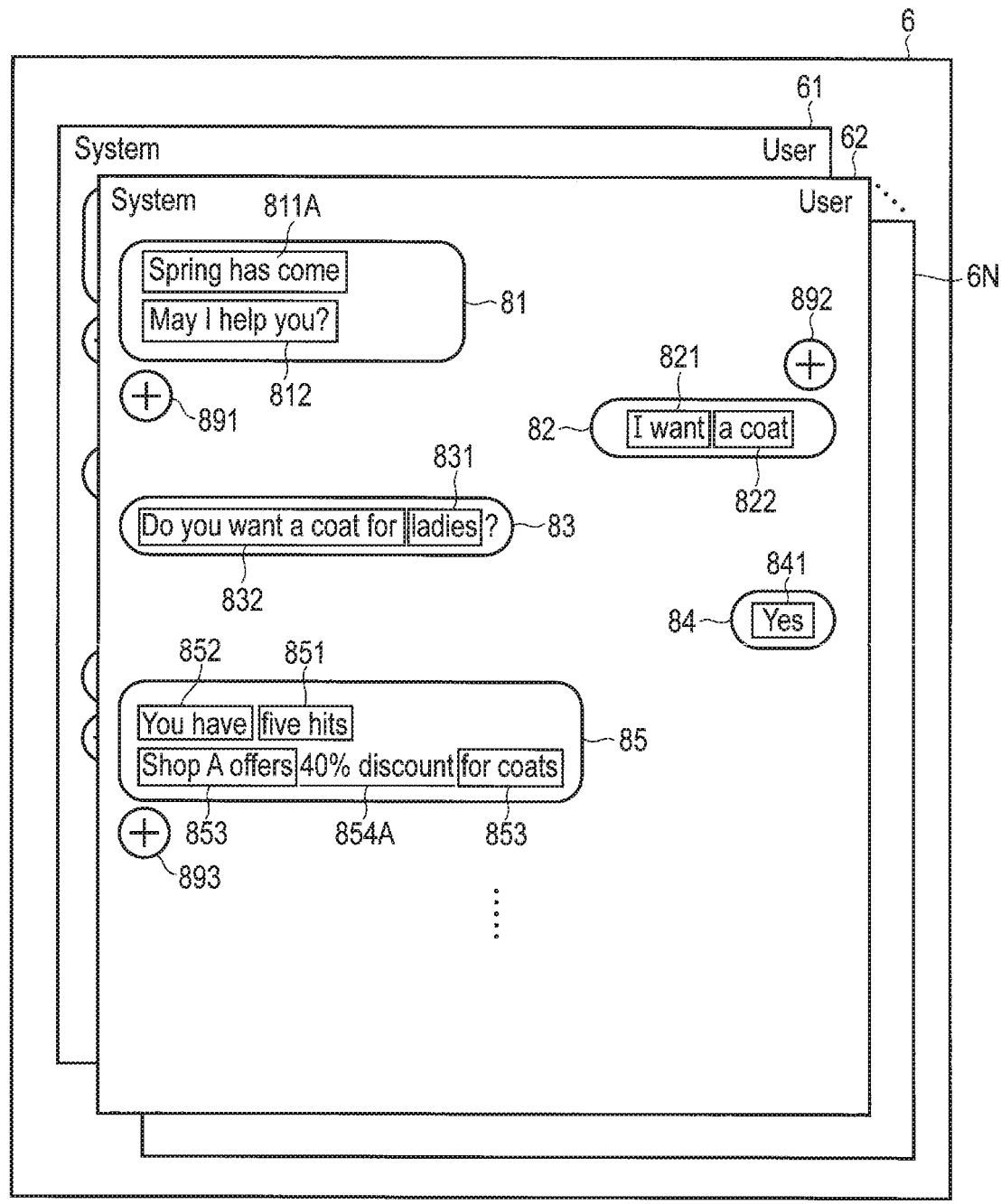
FIG. 10 is a view illustrating a fourth example of the scenario edit screen displayed by the client device in FIG. 3.

For example, the user who is the manager of the shop can perform an operation of changing an editable portion "20% discount" 854 illustrated in FIG. 9 to "40% discount!" 854A illustrated in FIG. 10. Further, the scenario edit screen 6 illustrated in FIG. 10 is displayed such that speech (portion) other than this editable portion 854A cannot be edited. Consequently, it is possible to control an editable portion in a scenario according to a type of the client device 20 or a type of a user who uses the client device 20.

Figure 11:
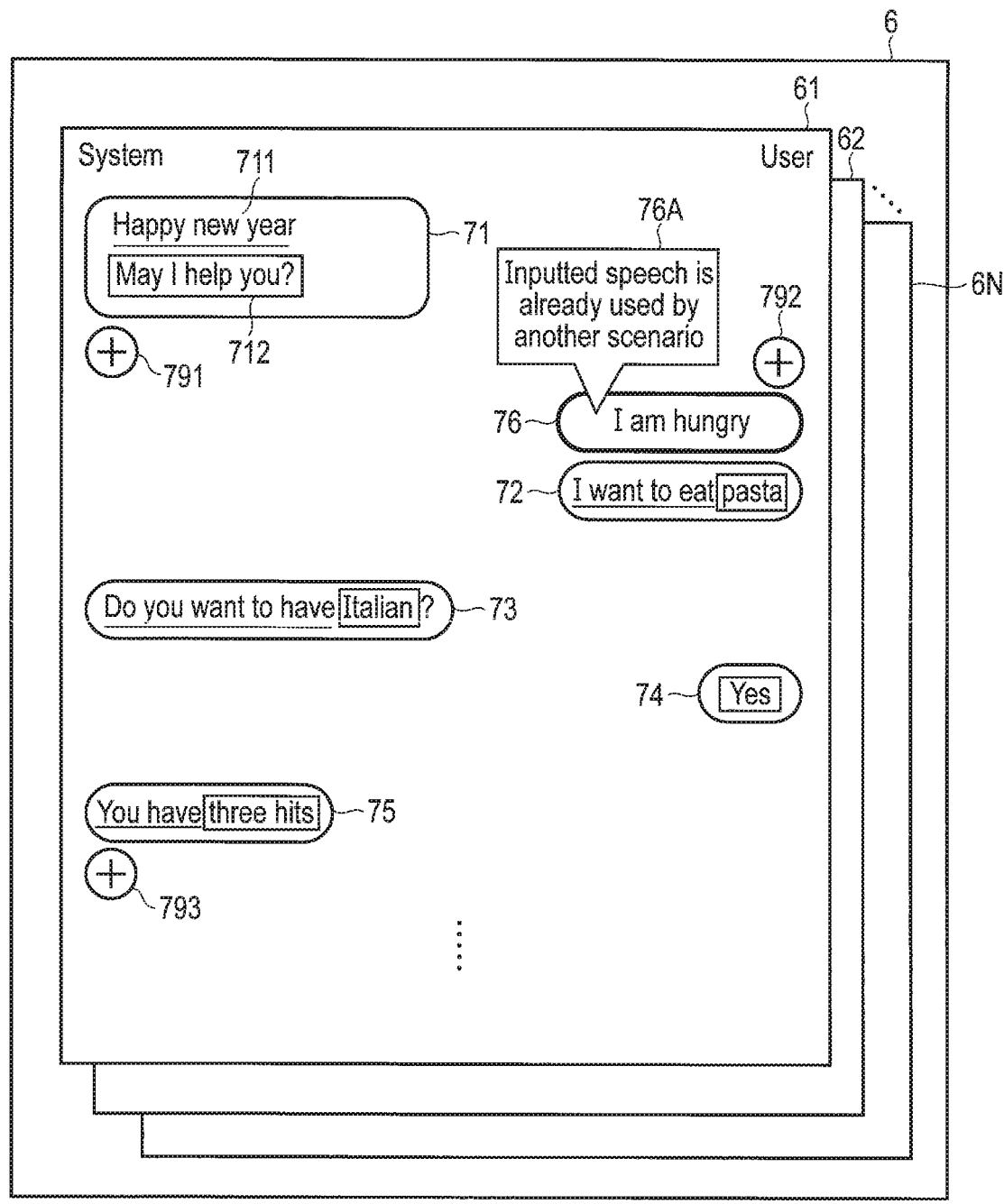
FIG. 11 is a view illustrating a fifth example of the scenario edit screen displayed by the client device in FIG. 3.

Next, FIG. 11 illustrates an example where speech is added to a scenario. In the scenario, speech can be added in a range that a state transition for an action (e.g., shop search or location search) intended by this scenario is not changed. For example, chat speech (dialog) which does not change the state transition of the scenario can be added to the scenario.

In the example illustrated in FIG. 11, an object 76 indicative of added speech is shown. This object 76 may be displayed to make it possible to identify newly added speech.

Further, when the new speech is added, information 76A which indicates whether the added speech is appropriate for the scenario and is associated with the object 76 may be displayed. This information 76A indicates that, for example, inputted speech has already been used by another scenario, or that inputted speech is likely to change a template for an action intended by this scenario. The user can perform an operation of changing speech contents or an operation of canceling addition of speech according to this information 76A.

Figure 12:
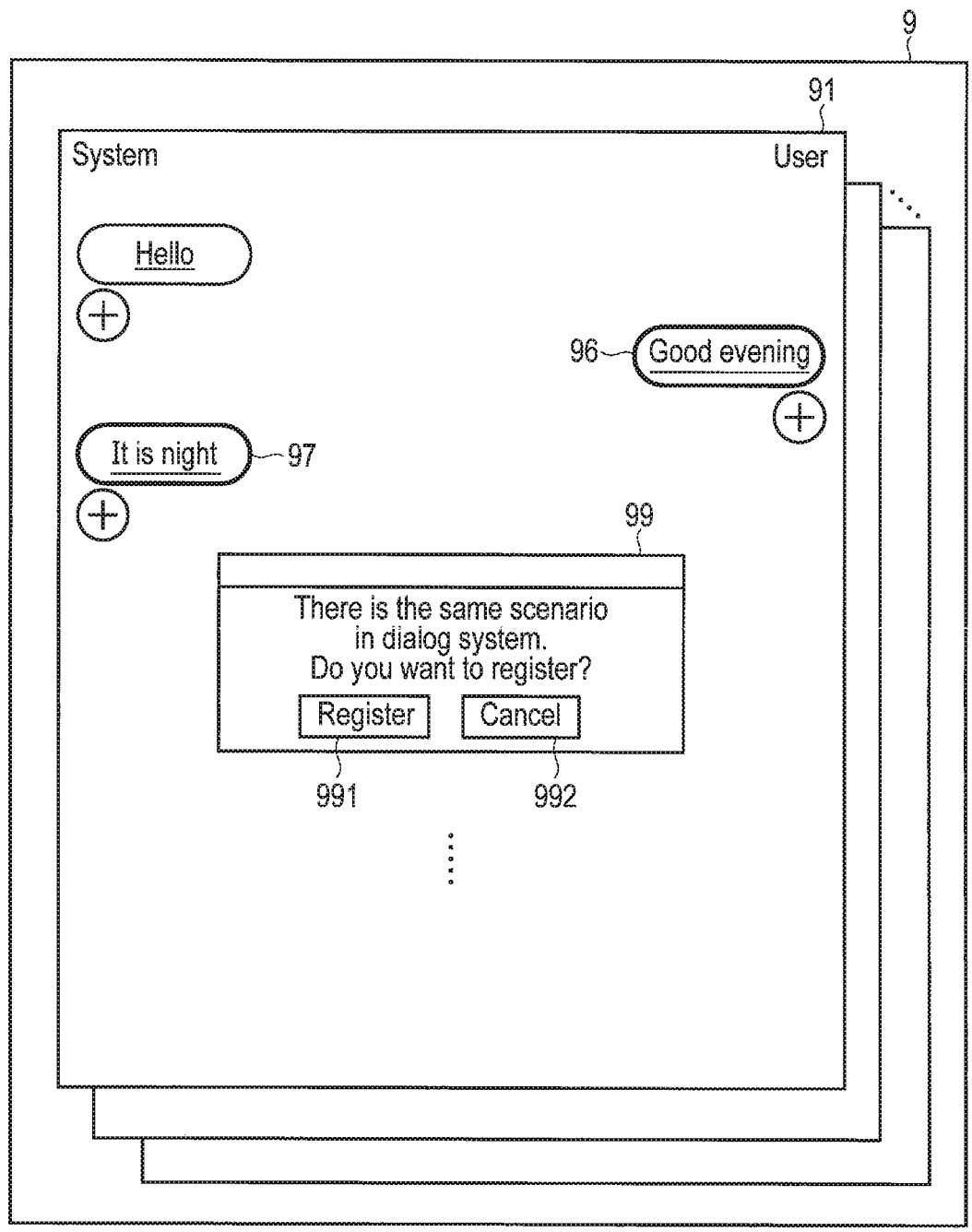
FIG. 12 is a view illustrating a sixth example of the scenario edit screen displayed by the client device in FIG. 3.

As illustrated in a scenario edit screen 9 in FIG. 12, when a scenario of a scenario edit page 91 including objects 96 and 97 indicating added speech is already registered in the server device 10, a dialogue 99 for asking the user about whether to register the scenario may be displayed. This dialogue 99 includes, for example, a button 991 for registering the scenario and a button 992 for canceling registration of the scenario. The user can register the scenario or cancel registration by performing an operation of selecting one of the buttons 991 and 992.

With reference to the flowchart in FIG. 13, an example of the procedure of scenario edit processing executed by the server device 10 will be described. This scenario edit processing is realized by, for example, executing instructions included in the edit assisting server program 103C by the CPU 101 of the server device 10.

First, the reception control module 46 determines whether the client device 20 has requested scenario data for editing (step S21). More specifically, the reception control module 46 determines whether data indicating a request for scenario for editing has been received from the client device 20 via the communication device 107. When the client device 20 does not request the scenario for editing (No in step S21), it is determined whether the client device 20 has requested the scenario for editing by returning to step S21.

In a case where the client device 20 has requested the scenario for editing (Yes in step S21), the edit processing module 47 reads edit scenario data corresponding to the requesting client device 20 from the scenario database 45 (step S22). The transmission control module 48 then transmits the read edit scenario data to the client device 20 (step S23). The client device 20 displays a scenario edit screen based on this edit scenario data.

Next, the reception control module 46 determines whether edit data indicating the edited scenario has been received from the client device 20 (step S24). When the edit data is not received (No in step S24), it is determined again whether the edit data has been received by returning to step S24.

Meanwhile, in a case where the edit data has been received (Yes in step S24), the edit processing module 47 updates data in the scenario database 45 by using this edit data (step S25).

Figure 14:
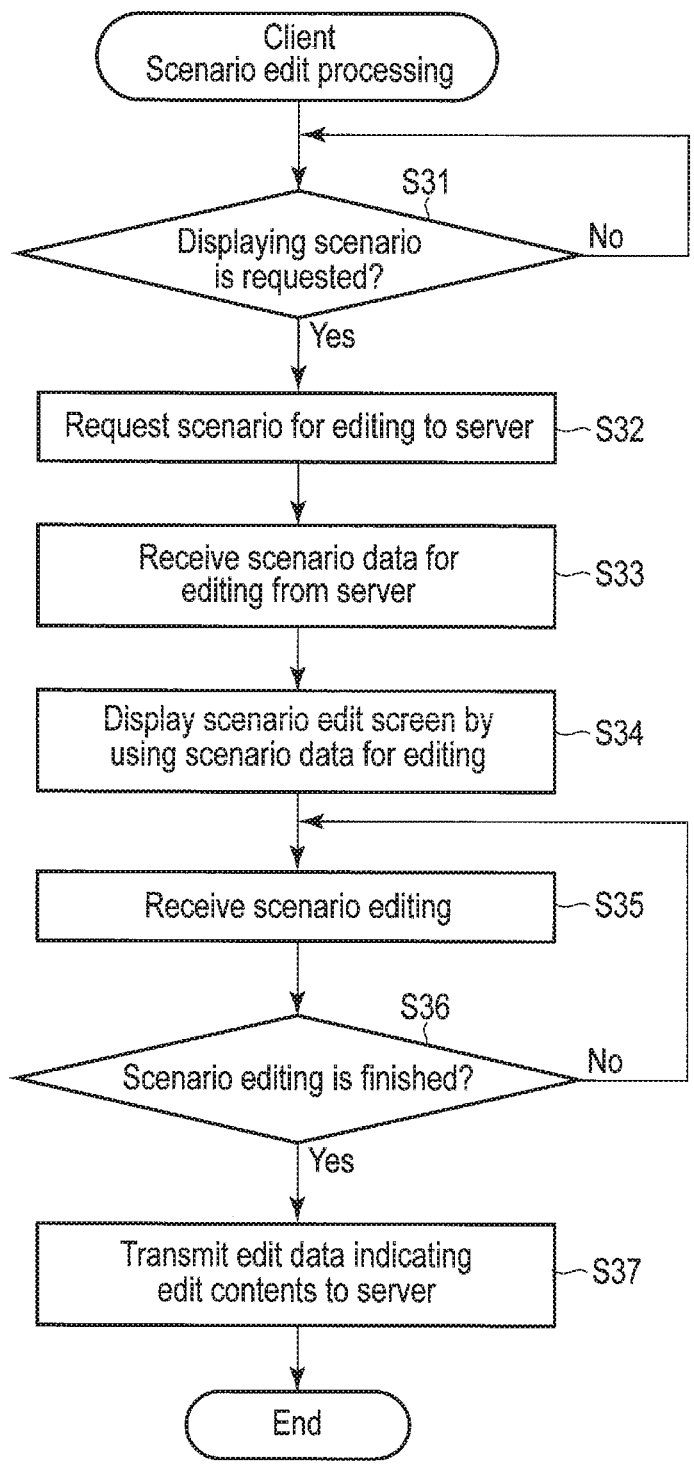
FIG. 14 is a flowchart illustrating an example of the procedure of scenario edit processing executed by the client device in FIG. 3.

Next, an example of the procedure of scenario edit processing executed by the client device 20 will be described with reference to the flowchart in FIG. 14. This scenario edit processing is realized by, for example, executing instructions included in the edit assisting client program 203B by, the CPU 201 of the client device 20.

First, the operation receiving module 53 determines whether displaying a scenario for editing has been requested (step S31). In a case where, for example, the edit assisting client program 203B is activated or the user performs a specific operation, the operation receiving module 53 determines that displaying the scenario for editing has been requested. When displaying the scenario for editing is not requested (No in step S31), it is determined whether displaying the scenario for editing has been requested by returning to step S31.

When displaying the scenario for editing has been requested (Yes in step S31), the transmission control module 54 requests the scenario for editing to the server device 10 via the communication device 207 (step S32). The reception control module 51 receives the edit scenario data from the server device 10 via the communication device 207 (step S33). The display control module 52 displays the scenario edit screen on the LCD 204A by using the received edit scenario data (step S34). The example of the scenario edit screen is as described above with reference to FIGS. 7 to 12.

Next, the operation receiving module 53 and the display control module 52 receive scenario editing according to an operation on the displayed scenario edit screen (step S35). According to an operation, the display control module 52 changes at least part of the object indicating speech on the scenario edit screen or adds a new object indicating speech on the scenario edit screen.

Further, the operation receiving module 53 determines whether the scenario editing has been finished (step S36). The operation receiving module 53 determines that the scenario editing has been finished, based on a specific operation indicating an end of editing (e.g., an operation of tapping an edit finish button). When the scenario editing is not finished (No in step S36), the process returns to step S35 to receive further scenario editing.

In a case where the scenario editing has been finished (Yes in step S36), the transmission control module 54 transmits edit data indicating edit contents to the server device 10 (step S37).

As described above, according to the present embodiment, it is possible to easily edit scenario data used by the dialog engine. The scenario database 45 of the server device 10 stores scenario data to generate speech data indicative of speech which responds to user's speech by using speech data indicative of the user's speech. The scenario data indicates scenarios of dialogs. Each of the dialogs includes speech of a user and speech generated by the server device 10. The transmission control module 48 transmits first scenario data indicative of a first scenario of the scenarios no the client device 20. The reception control module 51 of the client device 20 receives the first scenario data from the server device 10. The display control module 52 displays a first object and a second object on a screen of the LCD 204A based on the first scenario indicated in the first scenario data. The first object indicates a first speech of a user and further indicates a first portion of the first speech. The second object indicates a second speech generated by the server device 10 and further indicates a second portion of the second speech. The first portion and the second portion can be edited. The operation receiving module 53 and the transmission control module 54 transmit first edit data to the server device 10 when an operation of editing the first portion and/or the second portion is performed by a user who uses the client device 20. The first edit data indicates the edited first portion and/or the edited second portion. The reception control module 46 of the server device 10 further receives the first edit data from the client device 20. The edit processing module 47 rewrites the first scenario data by changing the first portion of the first speech and/or the second portion of the second speech included in the first scenario by using the first edit data.

The first portion and the second portion can be arbitrarily set according to, for example, a type of the client device 20 and/or a type of a manager. Consequently, an editable (changeable) portion of scenario data for a dialog is controlled according to the type of die client device 20 and/or the type of the manager, so that it is possible to easily and appropriately edit the scenario data 450 used by the dialog engine 103B.

Various functions described in the present embodiment may be implemented by a processing circuit. Examples of the processing circuit include a programmed processor such as a central processing unit (CPU). The processor realizes each of the described functions by executing a program (instructions) stored in a memory. The processor may be a microprocessor including an electronic circuit. Examples of the processing circuit also include a digital signal processor (DSP), an application-specific integrated circuit (ASIC), a microcontroller, a controller and other electronic circuit components. Each of the components other than the CPU described in the embodiments may also be implemented by a processing circuit.

Since each process of the embodiments can be implemented by a computer program, the same advantage as each of the embodiments can be easily achieved by loading the computer program into a general-purpose computer through a computer-readable storage medium that stores the computer program, and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An edit assisting system comprising:
   a server device; and
   a first client device, wherein
   the server device is configured to:
      store scenario data in a storage medium to generate, by using first speech data indicative of first speech of a user, second speech data indicative of second speech which responds to the first speech of the user, the scenario data indicative of scenarios of dialogs, each of the dialogs comprising the first speech of the user and the second speech generated by the server device; and
      transmit first scenario data indicative of a first scenario of the scenarios to the first client device,
   the first client device is configured to:
      receive the first scenario data from the server device;
      display a first object and a second object on a screen based on the first scenario indicated in the first scenario data, wherein the first object indicates the first speech of the user and further indicates a first portion of the first speech, and the second object indicates the second speech generated by the server device and further indicates a second portion of the second speech, wherein the first portion and the second portion are editable; and
      transmit first edit data to the server device when an operation of editing the first portion and/or the second portion is performed by a user who uses the first client device, the first edit data indicative of the edited first portion and/or the edited second portion, and
   the server device is further configured to:
      receive the first edit data from the first client device; and
      rewrite the first scenario data by changing the first portion of the first speech and/or the second portion of the second speech included in the first scenario by using the first edit data.

2. The edit assisting system of claim 1, wherein the first scenario data comprises information indicative of the first portion and the second portion which can be edited by the user who uses the first client device.

3. The edit assisting system of claim 1, wherein
   the first object further indicates a third portion of the first speech which is not editable, and
   the second object further indicates a fourth portion of the second speech which is not editable.

4. The edit assisting system of claim 3, wherein the first scenario data comprises information indicative of the third portion and the fourth portion which are not editable by the user who uses the first client device.

5. The edit assisting system of claim 1, further comprising a second client device, wherein
   the server device is further configured to transmit the first scenario data to the second client device, the first scenario data comprising information indicative of a fifth portion of the first speech and a sixth portion of the second speech, wherein the fifth portion and the sixth portion are editable by a user who uses the second client device,
   the second client device is configured to:
      receive the first scenario data from the server device;
      display a third object and a fourth object on a screen based on the first scenario indicated in the first scenario data, wherein the third object indicates the first speech and further indicates the fifth portion, and the fourth object indicates the second speech and further indicates the sixth portion; and
      transmit second edit data to the server device when an operation of editing the fifth portion and/or the sixth portion is performed by the user who uses the second client device, the second edit data indicative of the edited fifth portion and/or the edited sixth portion, and the server device is further configured to:
      receive the second edit data from the second client device; and
      rewrite the first scenario data by changing the fifth portion of the first speech and/or the sixth portion of the second speech included in the first scenario by using the second edit data.

6. The edit assisting system of claim 1, wherein
   the first client device is further configured to:
      display on the screen, a fifth object for adding new speech to the first scenario; and
      transmit additional data to the server device when an operation for adding third speech by using the fifth object is performed by a user who uses the first client device, the additional data indicative of the third speech, and
   the server device is further configured to:
      receive the additional data from the first client device; and
      rewrite the first scenario data by using the additional data such that the third speech is added to the first scenario.

7. The edit assisting system of claim 1, wherein
   the scenarios further comprise a second scenario of a dialog comprising the first speech,
   the server device is further configured to transmit the first scenario data indicative of the first scenario and second scenario data indicating the second scenario, to the first client device, and
   the first client device is further configured to:
      receive the first scenario data and the second scenario data from the server device;
      display a first page on a screen based on the first scenario indicated in the first scenario data, the first page comprising the first object and the second object; and display a second page on the screen based on the second scenario indicated in the second scenario data after an operation of editing the first portion is performed by a user who uses the first client device, the second page comprising a sixth object, wherein the sixth object indicates the first speech and comprises a third portion of the first speech which can be edited and is changed based on the edited first portion.

8. The edit assisting system of claim 7, wherein
the first client device is further configured to transmit third edit data to the server device, the third edit data indicative of the edited first portion and the changed third portion, and
the server device is further configured to:
receive the third edit data from the first client device;
rewrite the first scenario data by changing the first portion of the first speech included in the first scenario by using the third edit data; and
rewrite the second scenario data by changing the third portion of the first speech included in the second scenario by using the third edit data.

9. An edit assisting method comprising:
storing scenario data in a storage medium to generate, by using first speech data indicative of first speech of a user, second speech data indicative of second speech which responds to the first speech of the user, the scenario data indicative of scenarios of dialogs, each of the dialogs comprising the first speech of the user and the second speech generated by the server device;
transmitting first scenario data indicative of a first scenario of the scenarios to the first client device;
displaying a first object and a second object on a screen of the first client device based on the first scenario indicated in the first scenario data, wherein the first object indicates the first speech of the user and further indicates a first portion of the first speech, and the second object indicates the second speech generated by the server device and further indicates a second portion of the second speech, wherein the first portion and the second portion are editable;
transmitting first edit data to the server device when an operation of editing the first portion and/or the second portion is performed by a user who uses the first client device, the first edit data indicative of the edited first portion and/or the edited second portion; and
rewriting the first scenario data stored in the storage medium by changing the first portion of the first speech and/or the second portion of the second speech included in the first scenario by using the first edit data.

10. The edit assisting method of claim 9, wherein the first scenario data comprises information indicative of the first portion and the second portion which can be edited by the user who uses the first client device.

11. The edit assisting method of claim 9, wherein
the first object further indicates a third portion of the first speech which is not editable, and
the second object further indicates a fourth portion of the second speech which is not editable.

12. The edit assisting method of claim 11, wherein the first scenario data comprises information indicative of the third portion and the fourth portion which are not editable by the user who uses the first client device.

13. The edit assisting method of claim 9, further comprising:
transmitting the first scenario data to a second client device, the first scenario data comprising information indicative of a fifth portion of the first speech and a sixth portion of the second speech, wherein the fifth portion and the sixth portion are editable by a user who uses the second client device;
displaying a third object and a fourth object on a screen of the second client device based on the first scenario indicated in the first scenario data, wherein the third object indicates the first speech and further indicates the fifth portion, and the fourth object indicates the second speech and further indicates the sixth portion;
transmitting second edit data to the server device when an operation of editing the fifth portion and/or the sixth portion is performed by the user who uses the second client device, the second edit data indicative of the edited fifth portion and/or the edited sixth portion; and
rewriting the first scenario data stored in the storage medium by changing the fifth portion of the first speech and/or the sixth portion of the second speech included in the first scenario by using the second edit data.

14. The edit assisting method of claim 9, further comprising:
displaying on the screen of the first client device, a fifth object for adding new speech to the first scenario;
transmitting additional data to the server device when an operation for adding third speech by using the fifth object by a user who uses the first client device, the additional data indicative of the third speech; and
rewriting the first scenario data in the storage medium by using the additional data such that the third speech is added to the first scenario.

15. The edit assisting method of claim 9, wherein
the scenarios further comprise a second scenario of a dialog comprising the first speech, and
the edit assisting method further comprises:
transmitting the first scenario data indicative of the first scenario and second scenario data indicative of the second scenario, to the first client device;
displaying a first page on a screen of the first client device based on the first scenario indicated in the first scenario data, the first page comprising the first object and the second object; and
displaying a second page on the screen of the first client device based on the second scenario indicated in the second scenario data after an operation of editing the first portion is performed by a user who uses the first client device, the second page comprising a sixth object, wherein the sixth object indicates the first speech and comprises a third portion of the first speech which can be edited and is changed based on the edited first portion.

16. The edit assisting method of claim 15, further comprising:
transmitting third edit data to the server device, the third edit data indicative of the edited first portion and the changed third portion;
rewriting the first scenario data in the storage medium by changing the first portion of the first speech included in the first scenario by using the third edit data; and
rewriting the second scenario data in the storage medium by changing the third portion of the first speech included in the second scenario by using the third edit data.

17. An edit assisting device comprising:
a receiver configured to receive, from a server device, first scenario data indicative of a first scenario for a dialog comprising first speech data indicative of first speech of a user and second speech data indicative of second speech which responds to the first speech and is generated by the server device;

a controller configured to display, on a screen of a display, a first object and a second object based on the first scenario, wherein the first object indicates the first speech and further indicates a first portion of the first speech, the second object indicates the second speech and further indicates a second portion of the second speech, and the first portion and the second portion are editable; and a transmitter configured to transmit first edit data to the server device when an operation of editing the first portion and/or the second portion is performed by a user who uses the edit assisting device, the first edit data indicative of the edited first portion and/or the edited second portion.

18. The edit assisting device of claim 17, wherein the receiver is further configured to receive, from the server device, a second scenario data indicative of a second scenario of a dialog comprising the first speech, and the controller is further configured to:
  display a first page on the screen based on the first scenario, the first page comprising the first object and the second object; and
  display a second page on the screen based on the second scenario after an operation of editing the first portion is performed, the second page comprising a third object which indicates the first speech and comprises a third portion of the first speech which is editable and is changed based on the edited first portion.

* * * * *